April 8, 1924.

H. M. HARDY

HEADLIGHT

Filed Aug. 7, 1922   3 Sheets-Sheet 1

1,489,246

H. M. Hardy, INVENTOR

BY Victor J. Evans ATTORNEY

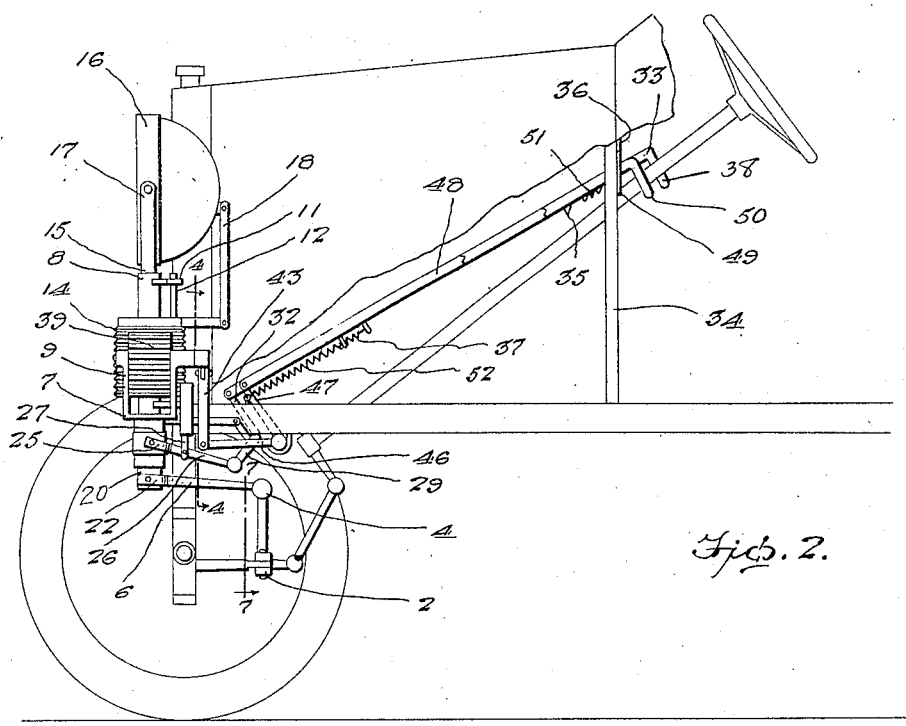
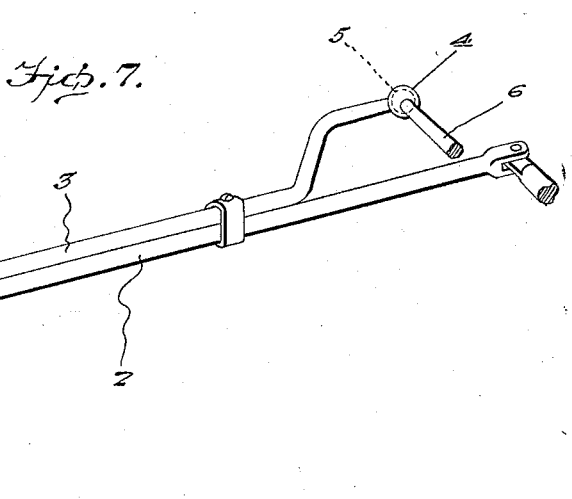

April 8, 1924.

H. M. HARDY

HEADLIGHT

Filed Aug. 7, 1922

H. M. Hardy INVENTOR

BY Victor J. Evans ATTORNEY

WITNESS:

Patented Apr. 8, 1924.

1,489,246

UNITED STATES PATENT OFFICE.

HARLEY M. HARDY, OF PORTLAND, OREGON.

HEADLIGHT.

Application filed August 7, 1922. Serial No. 580,222.

*To all whom it may concern:*

Be it known that I, HARLEY M. HARDY, a citizen of the United States, residing at Portland, in the county of Multnomah and State of Oregon, have invented new and useful Improvements in Headlights, of which the following is a specification.

My present invention has reference to a headlight control for vehicles, particularly for automobiles.

In carrying out my invention, it is my purpose to produce a means whereby the headlights of an automobile or like vehicle may be caused to turn in the direction of and in unison with the steering wheels; wherein the headlight turning means may be shifted to prevent the turning of the headlights, and also wherein means is provided for tilting the headlights so that the glare of light therefrom will be directed downwardly on the road surface over which the vehicle travels, and as a consequence to produce a means which will meet all requirements in the night driving of the vehicle as well as the restrictions placed upon the headlights by the laws in the various States.

A further object is to produce a mechanism of this character which shall embody the desirable features of simplicity in construction, ease in application, and efficiency in operation.

The foregoing, and other objects which will present themselves as the nature of the invention is better understood, may be accomplished by a construction, combination and operative association of parts such as is disclosed by the drawings which accompany and form part of this application.

In the drawings:—

Figure 2 is a side elevation thereof.

Figure 7 is a sectional view on the line 7—7 of Figure 2.

Figure 1:
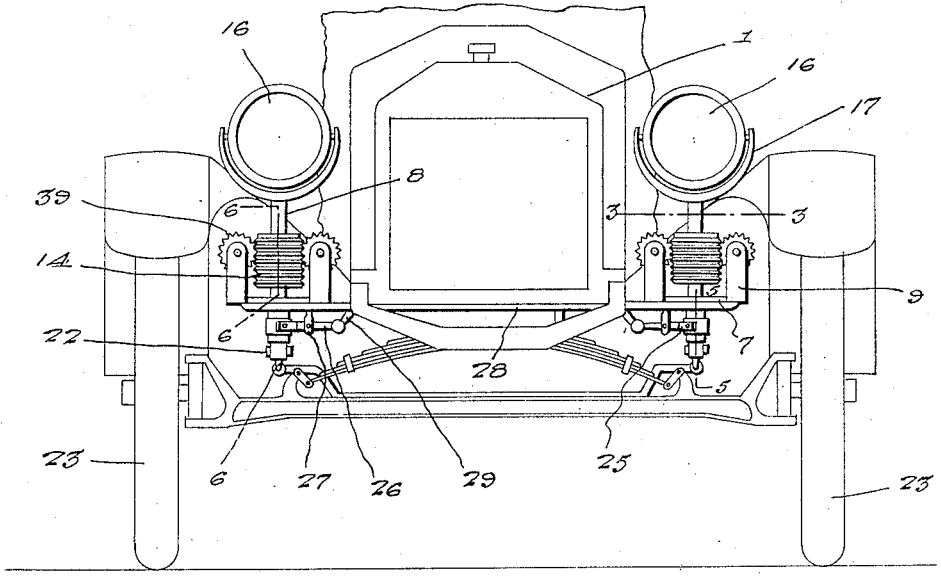
Figure 1 is a front elevation of an automobile provided with my improvement.
Figures 4, 5:
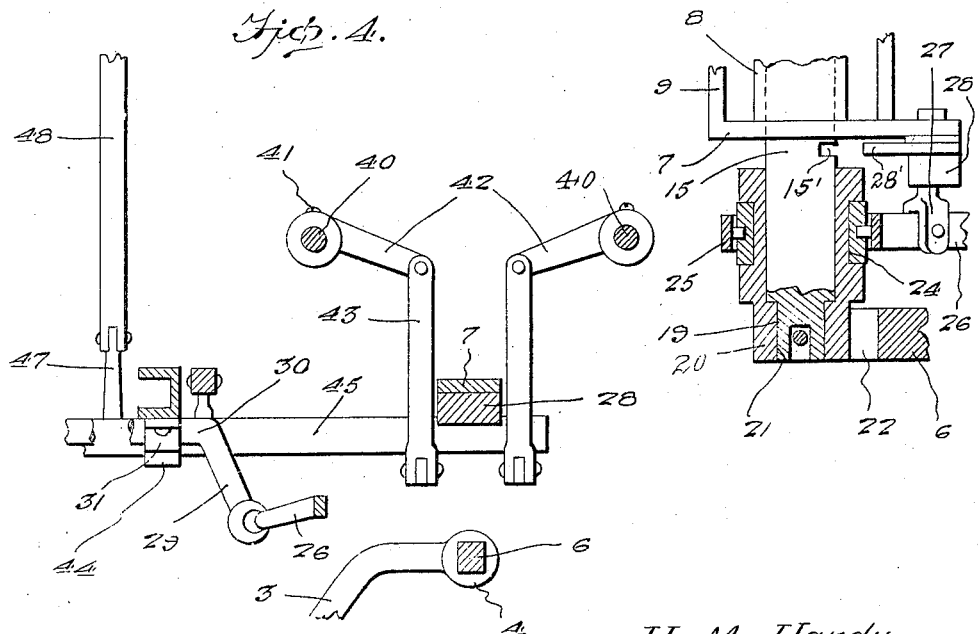
Figure 4 is a sectional view approximately on the line 4—4 of Figure 2.
Figure 5 is a sectional view on the line 5—5 of Figure 1.
Figure 3:
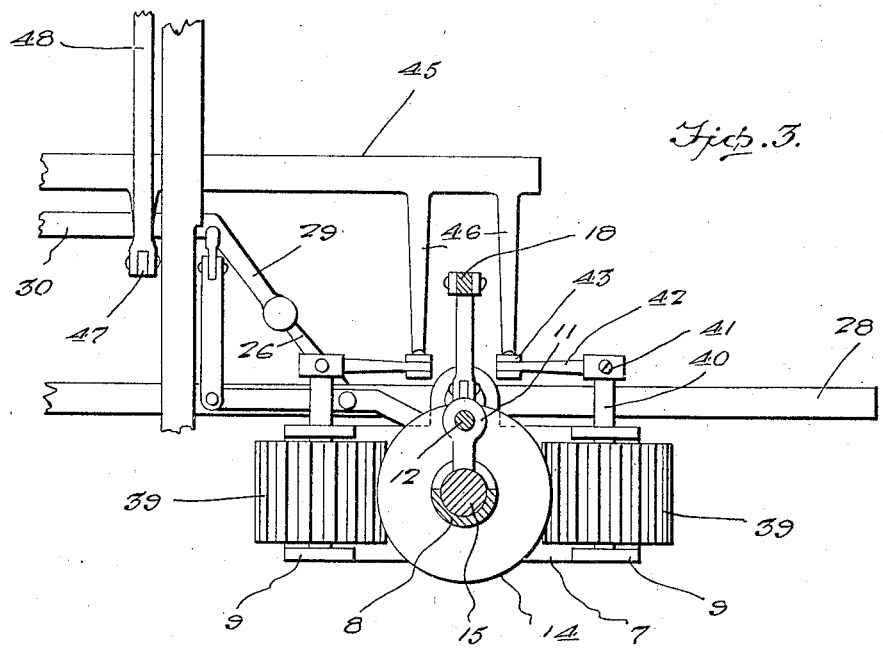
Figure 3 is a sectional view approximately on the line 3—3 of Figure 1.
Figure 6:
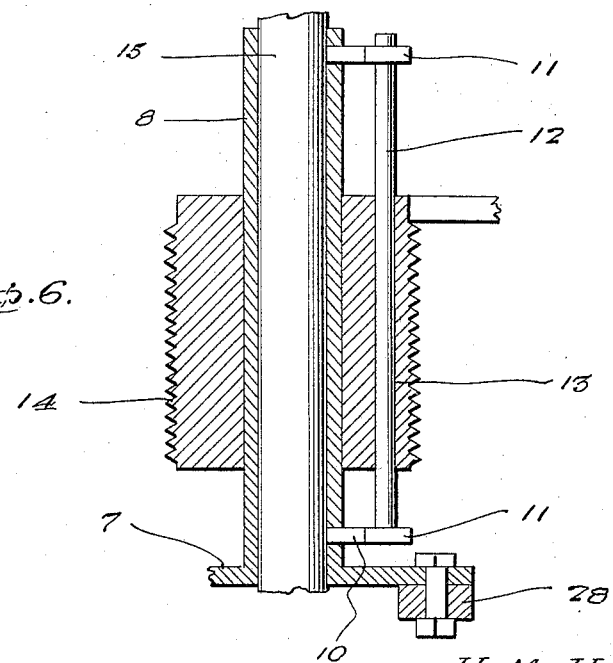
Figure 6 is a sectional view on the line 6—6 of Figure 1.

The front or steering wheels of the vehicle 1 are journaled, in the usual manner, on the axle spindles which are pivotally connected to the forked ends of the front axle of the vehicle, the knuckles for the spindles being connected in the usual manner by the rod 2, and the rod 2 is moved laterally in the usual manner by the means connected between the steering post and the said rod. In the present instance, I secure upon the top of the connecting rod 2 a bar 3, the said bar having its ends rounded upwardly and outwardly. The ends of the bar, indicated for distinction by the numeral 4 have spherical bearings for the ball heads 5 on the ends of arms 6 that are directed toward the front of the vehicle.

On the front of the vehicle to the sides of the radiator, there are brackets 7 rigidly supported in any desired or preferred manner. Each bracket is centrally provided with an upstanding hollow standard 8 which is in the nature of a tubular member, the lower flat face of each bracket having at its upper corners upstanding ears 9.

To the rear face of each of the tubular standards 8, adjacent to the top and bottom of the same are rearwardly extending members 10 provided with eyes 11 and through these eyes there is passed a cross sectionally rounded rod or pin 12, the said pin being secured in the eyes in any desired manner. The pin 12 passes through an opening 13 in a cross sectionally rounded peripherally threaded block member 14 which holds the latter from turning on the standard. Received through each standard 9 is the cross sectionally rounded post 15 for the head lamps 16. Each post 15 has secured to its upper end a fork 17 and between the arms of these forks the casings of the head lamps 16 are pivotally supported.

Pivotally connected to each block 14 and to the rear of each of the casings for the head lamps 16 is a link 18. It will be apparent that when the blocks 14 are caused to slide in an upward direction on the standards 8 the links 18 will swing the headlights on their pivotal connection with the forks of the posts so that the rays of light from the lamps will be directed at a downward angle toward the roadway on which the vehicle travels.

The posts 15 project a suitable distance below the lower flat faces of the brackets 7, and the lower ends of the said posts are square in cross section, as indicated by the numeral 19. Slidable on the said lower ends of the posts is a sleeve 20. The sleeve is really in the nature of a clutch element, having its bore, at the lower or outer end thereof squared, as at 21, to engage the squared end 19 of the post 15. The lower or clutch ends of the sleeves 20 have pivotally secured thereto the forked ends 22 of the arms 6, and whereby, when the sleeves are in clutching engagement with the post, the latter will be turned in unison with and in the same direction as the steering wheels 23 of the vehicle.

Each clutch sleeve 20 has a peripheral groove or recess 24 that receives therein the forked or rounded ends 25 of links 26 that are pivotally supported between the forked or bifurcated ends of members 27 that depend from the brackets 7 or which may be directly connected to the supporting means 28 for the brackets. It will be noted by reference to the drawings that the pivoted members 26 are directed at an inward angle with respect to the vehicle, and the ends of the said members 26 are pivotally secured in the forked and angle ends 29 of a shaft 30. Each of the members 28 carries a lateral finger 28' which are engageable in recesses or notches 15' in member 15 to impart vertical movement to the post upon upward movement of the links 26. The shaft 30 is journaled in suitable bearings 31 secured on the under face of the longitudinal beams for the frame of the vehicle, or secured upon any other desirable supporting means.

The shaft 30 has connected therewith an upwardly directed angularly disposed finger 32 to which is pivoted a lever 33 that passes through a suitable opening in the dash 34 of the vehicle 1. The lever, at the portion thereof passing through the opening in the dash is formed with a depending tooth 35 that is designed to engage with the edge of a plate 36 on a frame member that surrounds the opening through which the said lever passes. Also connected with the lever and with the frame or support for the shaft 30 there is a helical spring 37. It will be apparent that when the handle end 38 of the lever is grasped to draw the lever through the opening in the dash against the pressure of the spring that the shaft 30 will be turned in its bearings to swing the links to draw the clutch sleeves out of clutching engagement with the posts, and thereby permitting the lamps assuming a stationary position regardless of the turning of the steering wheels of the vehicle. To hold the device in this position the tooth 35 is brought to engage with the latching or holding plate 36. An upward pressure upon the handle end 38 of the lever permits the spring 37 to move the lever longitudinally in an opposite direction which, of course, causes the turning of the shaft 30 in an opposite direction so that the links are swung on their pivots to move the clutch sleeves into clutching engagement with the lamp posts, and consequently allowing the bar 3 to influence the arms 6 to turn the posts and lamps simultaneously with and in the direction of the turning of the steering wheels.

Between the opposed pairs of ears 9 at the corners of the brackets 7 there are pivotally secured toothed wheels 39. The teeth of these wheels are in mesh with the teeth of the elements 14 which I have termed blocks. The shafts for the toothed wheels 39 are, for distinction, indicated by the numeral 40, the said shafts projecting a suitable distance beyond the rear ears 9 and have removably secured thereon by means 41 the eye ends of short arms or links 42. The links 42 are directed toward each other and have their free ends pivotally connected to depending links 43 respectively. Journaled in suitable bearings 44 on the means that support the bearings 31 for the shafts 30 and disposed directly to the rear of said bearings 31, is a shaft 45. This shaft, at and adjacent to its ends is provided with a pair of outwardly projecting fingers 46 respectively, and these fingers are pivotally connected to the respective pairs of depending links 43. The shaft 45 has secured thereon an angularly disposed outwardly directed arm 47 to which there is pivoted the bifurcated end of a lever 48. The lever 48 is substantially similar to the lever 33, the said lever 48 passing through an opening surrounded by a metal frame 49 in the dash of the vehicle, the said lever having its free end provided with a handle portion 50 and being preferably formed with depending teeth 51 to engage the lower member of the frame 49. To the lever there is also connected a spring 52 that is secured to the frame or the supports for the bearings of the shafts 45 and 30. It will be apparent that when the lever is drawn inwardly through the dash, the finger thereon will cause the turning of the shaft 45, and consequently swing the fingers connected to the shaft to move the depending links 43 and likewise swing the links 42 that are fixed to the shafts 40 of the toothed elements 49, causing the latter to bring the blocks 14 upwardly on the tubular standards 8 to influence the links connected between the lamp casings and blocks to tilt the said head lamps so that the rays of light will be directed downwardly therefrom, as previously referred to. A release of the lever 48 will permit of the spring 52 returning the parts to initial position.

It is believed that the foregoing description, when taken in connection with the drawings will fully set forth the construction, operation and advantages of the improvement to those skilled in the art to which this invention relates. The nature of the invention is such, however, as to render the same susceptible to changes and modifications, and therefore I desire it to be understood that I am not to be restricted to the construction shown by the drawings and herein described, but am entitled to all such changes therefrom as fall within the scope of what I claim.

Having described the invention, I claim:

1. An automobile having headlights, brackets thereon, hollow standards secured to the brackets, posts in the standards and having upper forked ends to which the headlights are pivoted, a block slidable on each post, means slidable in the standards, means connected with said slidable means and passing through the blocks for locking the blocks to said slidable means, clutch means associated with said slidable means, means pivotally connected with the clutch means and loosely connected to the steering knuckle connecting rod of the automobile, lever actuated means for the clutch means for locking the same to the slidable means or for disconnecting the same therefrom, latching means for the lever means, spring means influencing the lever means in one direction, means pivotally supported on the brackets, coengaging with the blocks, lever operated means for turning said last mentioned means to cause the blocks to move vertically on the posts, and means connected with the blocks and with the headlights for tilting the latter when the blocks are thus influenced.

2. An automobile having headlights, brackets secured to the front thereof, hollow slotted standards secured to the brackets, posts in the standards and having upper forked ends to which the headlamps are pivoted, peripherally rounded threaded blocks slidable on the standards, posts slidable through the brackets and entering the standards, posts passing through the slots thereof and through the blocks, pivoted means between the blocks and the head lamps, clutch means associated with the members, pivoted means connecting said clutch means with the steering knuckle connecting rod of the automobile, spring influenced lever operated means connected with the clutch means for locking the same to the members or for disconnecting the same therefrom, toothed elements pivotally supported on the brackets engaging the teeth of the blocks, spring influenced lever operated means for turning said elements to cause a movement of the blocks on the posts and for also causing the tilting of the headlights, and latching means for said last mentioned lever operated means.

In testimony whereof I affix my signature.

HARLEY M. HARDY.